…

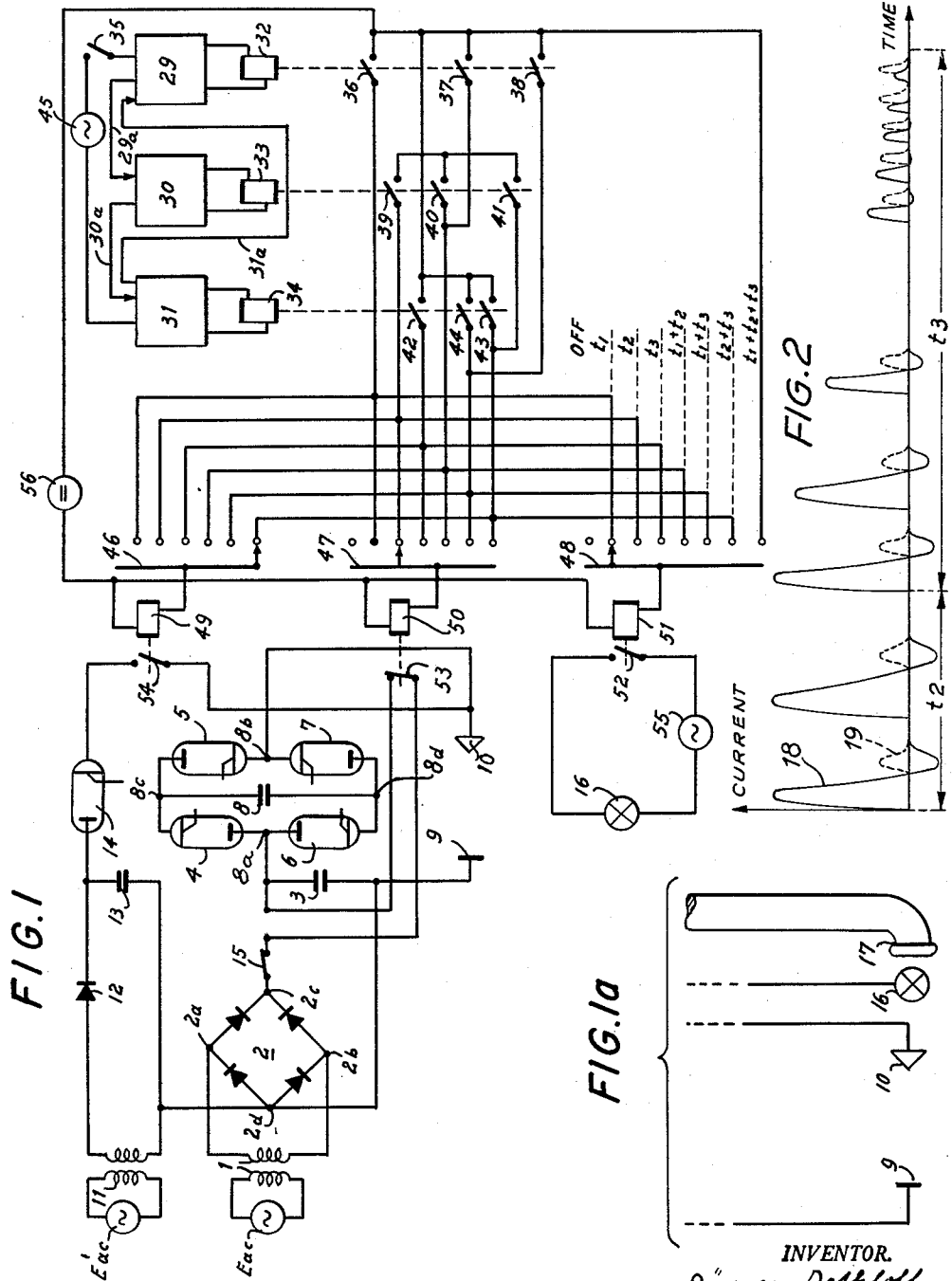

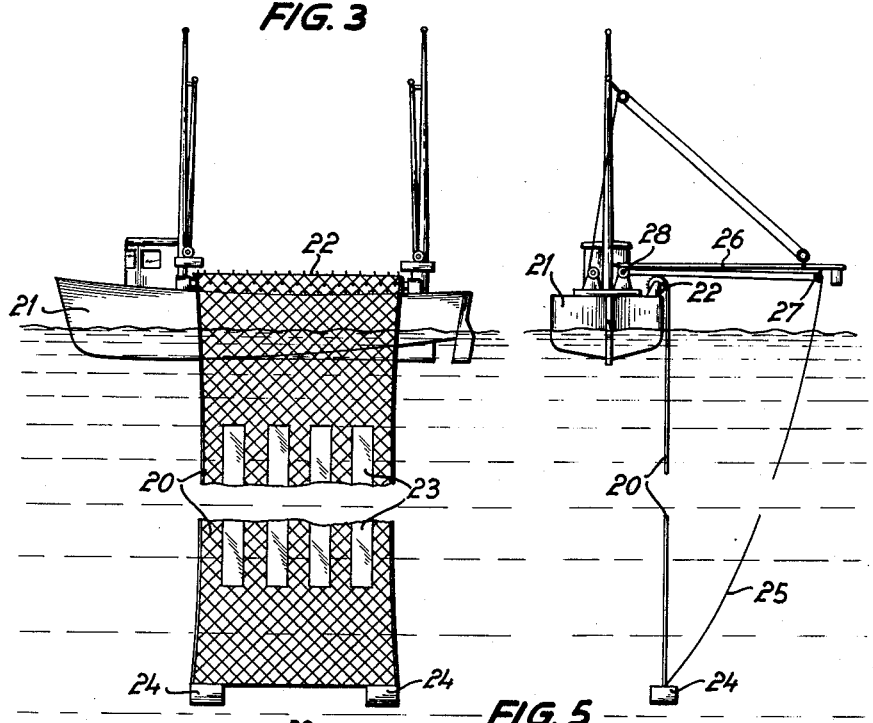
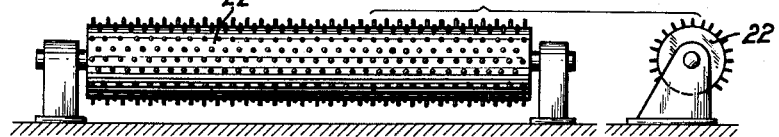
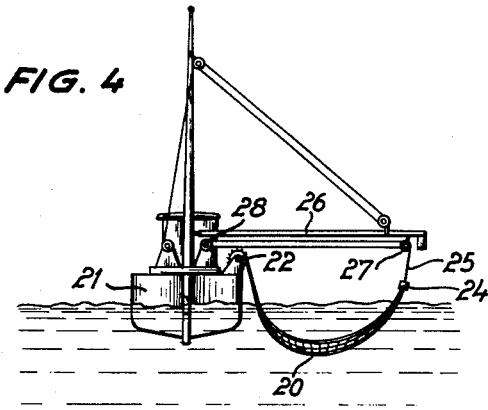

United States Patent Office 3,009,278
Patented Nov. 21, 1961

3,009,278
ELECTRICAL FISHING METHOD AND APPARATUS
Jürgen Dethloff, Avenariusstrasse 30, Hamburg-Blankensee, Germany
Filed Aug. 17, 1959, Ser. No. 834,199
Claims priority, application Germany Aug. 19, 1958
30 Claims. (Cl. 43—4.5)

This invention relates to electrical fishing methods and apparatus and has for its principal object provision for efficient, simple and economical electrical method and means for capturing fish.

Electrical fishing methods contemplated by the present invention are broadly old, but have been characterized by certain disadvantages, which have resulted in failure to capture large numbers of fish that were in the capture range. These disadvantages, and the steps and means of the present invention for avoiding the same, will be pointed out in the course of the following detailed specification, of which the appended claims form a part, considered together with the accompanying drawings, in which:

FIG. 1 is a schematic drawing of electrical method and apparatus according to a preferred embodiment of the invention;

FIG. 1a is a schematic drawing of apparatus auxiliary to that of FIG. 1, illustrative of fish capture by pumping;

FIG. 2 is a timing diagram indicative of the currents supplied by elements of FIG. 1 to the fishing electrodes;

FIGS. 3, 4 and 5 are diagrammatic drawings of apparatus auxiliary to that of FIG. 1 and alternative to that of FIG. 1a, illustrating the invention as applied to net capture of fish.

Figure 6:
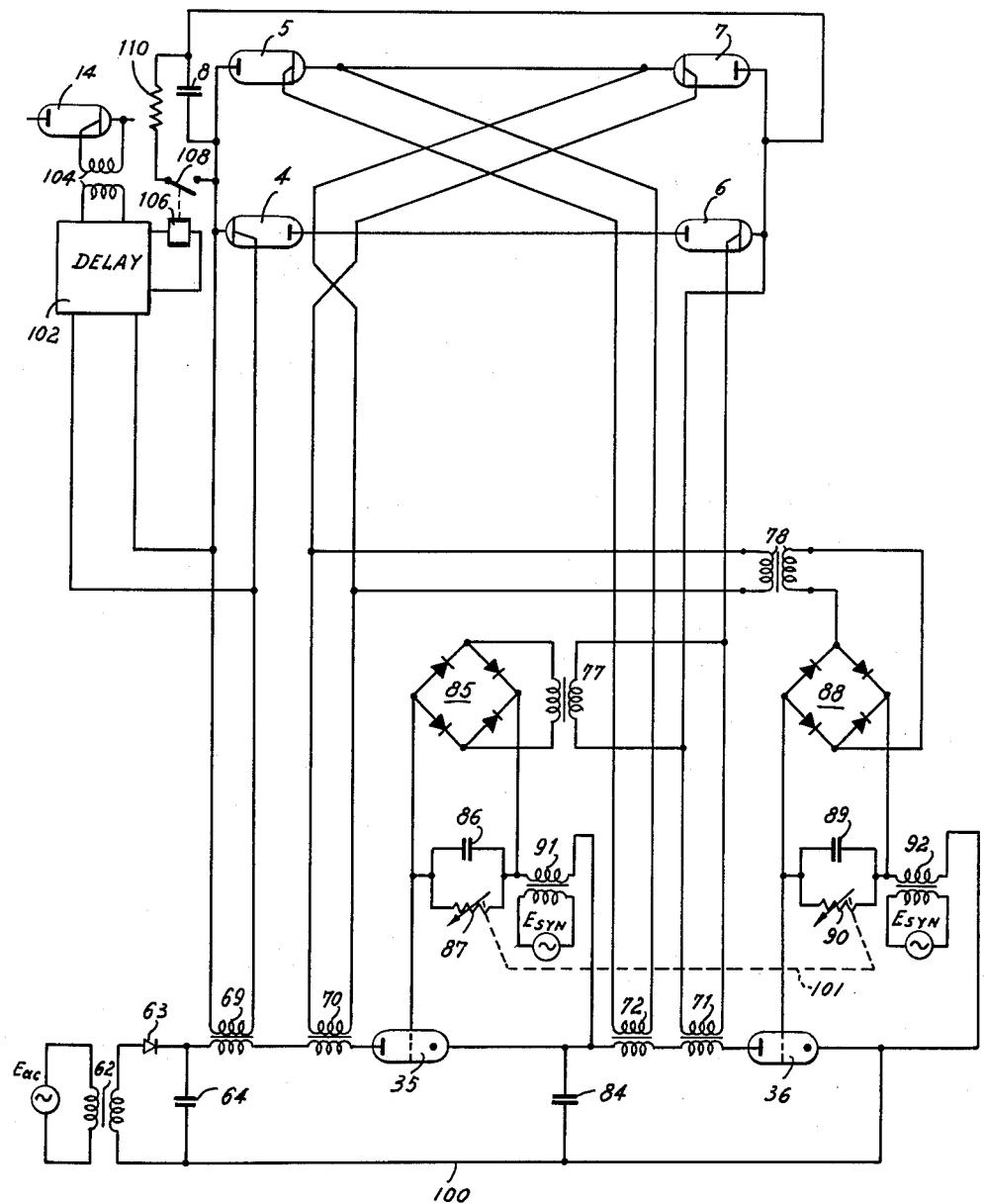
FIG. 6 is a detailed electrical schematic drawing of certain parts illustrated in FIG. 1 in simplified form.

Referring to FIG. 1, voltage from an alternating current source $E_{ac}$ is applied to the primary winding of a transformer 1, to whose secondary winding the input junctions 2a and 2b of a bridge rectifier are connected. The rectifier is arranged by reason of the indicated diode connections to provide unidirectional voltage at the bridge junction 2c that is of positive polarity with respect to the remaining bridge junction 2d. The latter junction is connected to the cathode 9 which is immersed in sea water.

The rectified potential at junction 2c is routed via a manually operable switch 15 and a contact 53, both presently closed, to the upper plate of a capacitor 3, whose lower plate is connected to cathode 9. The capacitor accordingly charges to the peak value of the incoming alternating voltage.

The upper plate of capacitor 3 is further connected to a junction 8a of an ignitron bridge network which includes ignitrons 4, 5, 6 and 7. The junction 8a is formed by the anodes of ignitrons 4 and 6, while the thereto opposite junction 8b is formed by the cathodes of ignitrons 5 and 7 and is connected to the anode 10 immersed in sea water. The junction 8c is formed by the cathode of ignitron 4 and anode of ignitron 5 while remaining junction 8d is formed by the cathode of ignitron 6 and anode of ignitron 7. A capacitor 8 is connected across junctions 8c and 8d.

The control electrodes of the ignitrons are excited by a firing circuit more fully described with reference to FIG. 6 hereinafter. The arrangement is such that firing impulses are applied simultaneously to the control electrodes of the ignitrons 4 and 7, rendering the same conductive. Prior to application of these firing impulses the capacitor 8 had been charged substantially to the potential of capacitor 3 with terminal 8d positive with respect to terminal 8c. With commencement of conduction of the ignitrons 4 and 7, the potentials of capacitors 3 and 8 are initially applied additively to the anode 10. The impedance seen between electrodes 10 and 9 may be assumed to be a low resistance, for the time being. Accordingly, a current flows between the electrodes which rises to an initial maximum approximately equal to twice the potential across capacitor 3 divided by the inter-electrode impedance. The charge initially on capacitor 8 is discharged and the capacitor charges again to the potential of capacitor 3 but with reversed polarity, and accordingly the inter-electrode current drops from the maximum ultimately to zero. The condition of zero current is attained upon extinction of the ignitrons 4 and 7 resultant from the recharging of capacitor 8. The circuit remains in this condition until firing potentials are applied simultaneously to the control electrodes of the ignitrons 5 and 6. Recalling that terminal 8c is now positive with respect to terminal 8d, once more approximately twice the potential of capacitor 3 is applied to the anode 10. Once more the inter-electrode current rises to a peak determined by such doubled voltage, and then decays to zero as the capacitor 8 discharges and then recharges to the potential of capacitor 3, but with reversed polarity, that is terminal 8d positive with respect to terminal 8c as in the beginning. The aforegoing set of events is cyclical. The submarine inter-electrode current thus flows in a succession of sharp impulses. It should be noted that initially capacitor 8 is uncharged, so that the initial firing of a pair of ignitron channels merely the voltage of capacitor 8 to anode 10, subsequently double this voltage is applied as just described. The generation of current impulses for electro-fishing is broadly old and is predicated on several physiological factors. In the immediate vicinity of the anode 10 there exists a region of "electronarcosis" in which the fish are numbed or even killed. They may be taken aboard the fishing vessel by means of a fish pump 17 located adjacent to the anode 10 (FIG. 1a). Adjacent to the electro-narcosis region there is a region of electro-attraction, in which fish are attracted towards the anode 10. Finally there is a region of "first reaction" following the electro-attraction region, in which the fish quite on the contrary tend to regress and flee from the anode 10.

Electro-fishing methods based on apparatus generally of the character of that so far described suffers from several disadvantages, which are eliminated by the present invention:

(1) In the electro-narcosis region at least part of the numbed fish sink to the bottom and thus are lost. This defect has been remedied in prior approaches by gradual switching in of resistances or inductances in the impulse charging current circuit, as a result of which the electric field in the water was reduced continuously or step-by-step.

(2) Even with additional inductance or resistance in the impulse current circuit omitted, owing to the inherent inductance of the lead cables connected to the electrodes 9 and 10, and also that of the sea water, the impulse current assumes the form of a damped oscillation, so that the current as well as the electrode potential pass through zero and assume negative values, that is experience overshoots. The negative part of the current impulse, if of sufficient magnitude, tends to repel the fish from the anode and is therefore objectionable. Attempts have been made heretofore to remedy this defect by provision of mechanical switches in the impulse current circuit, which are opened at the instant of zero impulse current. The unavoidable mechanical and electrical time constant of the switches places an upper limit on the impulse frequency, and further renders the instant of switch operation determinable only with a relatively wide tolerance.

Reference is made to FIG. 2, wherein the sea water current impulses are designated by reference numeral 18. As shown they rise instantly from zero to a maximum, then drop to and below zero to a negative minimum and then reverse to zero. In accordance with the present invention, the above two disadvantageous effects are overcome by applying compensating positive current impulses 19 corresponding in time to, and neutralizing the negative portions of the main impulses 18. The electro-narcosis effect is not immediate, so that initial application of the current impulses 18 during the time interval $t_2$ merely attracts the fish to anode 10, but does not numb or kill them. During this time interval, which may be of the order of seconds for herring, the main impulses 18 are generated to fullest extent, and any fish brought within effective range of the pump 17, are pumped aboard. When at the termination of time interval $t_2$ the electro-narcosis effect commences, the switch 15 (FIG. 1) may be opened. Thereafter, during the succeeding time interval $t_3$, again of the order of seconds for herring, the compensating or auxiliary impulses 19 are continued in full force, the capacitor 3 continues to charge and recharge capacitor 8, but since now its own charge is no longer replenished, the main impulses 18 decay exponentially, as regards both its negative and positive portions. In this manner the repellant effect of the negative current impulses, and the loss of fish due to electro-narcosis are substantially overcome and substantially all the fish within capture range may be brought aboard.

Before considering the generation of the auxiliary impulses 19 it is pointed out, that the just described remedial measures may be sufficient for many applications; there remain however two secondary drawbacks. For one, some of the fish that were initially attracted to the anode 10, are repelled owing to the first reaction. Further, once all the fish in a given area have been caught, the vessel must move on to another area. These remaining disadvantages may be overcome by preceding the application of the current impulses during the time intervals $t_2$ and $t_3$ with lighting a lamp 16 immersed adjacent the pump 17 (FIG. 1a) during time interval $t_1$. Then, after termination of the time interval $t_3$, the cycle of lighting lamp 16, then applying the main impulses 18 at full strength together with compensating impulses 19, and finally applying the main impulses 18 with diminishing strength while continuing the auxiliary impulses 19, is repeated periodically.

The additional procedure just described is predicated on a further physiological effect, namely that of luring the fish by light effect. This is effective for distances much greater than electro-attraction, and furthermore produces no equivalent to the first reaction. The lighting effect attracts the fish into the region of electro-attraction in avoidance of the region of first reaction. It is to be observed that lure by lighting alone is generally not feasible as the fish are capable of avoiding the pump in the absence of electrical effects. Accordingly the lamp 16 is extinguished when the prey has entered the electro-attraction region, and is lighted again upon capture of the entire previously attracted fish. In this manner the fishing vessel may remain in the same location for extended periods. The duration of the time interval $t_1$ is also dependent on the species of fish; again it is of the order of seconds for herring.

Referring again to FIG. 1, the circuitry for generation of the auxiliary pulses 19 includes a transformer 11, whose primary winding is energized by a separate alternating supply voltage $E'_{ac}$. Its secondary winding has one end connected to the cathode 9, whereas its other end is connected to the anode of a rectifier diode 12, whose cathode is connected to the upper plate of a capacitor 13, whose lower plate is tied to cathode 9. The capacitor 13 is thus charged to the peak voltage of the transformer secondary.

The upper plate of capacitor 13 is further connected to the anode of an ignitron 14, whose cathode is connected through contact 54, assuming that the same is closed, to the anode 10. The control electrode of the ignitron 14 is excited by a firing circuit operated in predetermined time relation with that for the ignitrons 4, 5, 6 and 7 referred to hereinafter in connection with the description of FIG. 6. Upon application of a firing impulse to its control electrode, the ignitron 14 conducts, the capacitor 13 discharges therethrough and through the submarine inter-electrode path. The current wave form is that illustrated by the impulses 19 in FIG. 2. When the anode-to-cathode potential of the ignitron 14 drops to a sufficiently low value, conduction ceases. The capacitor 14 is recharged through diode 12. The auxiliary impulses 19 may also drop slightly below zero, but will not drop below the threshold level required to repel the fish from anode 10, even during the time interval $t_3$ when the main impulses decay to zero.

A complete cycle of operations is as follows: Initially the lamp 16 (FIG. 1) is energized by closure of the contact 52 from alternating source 55. The lamp remains lit throughout time interval $t_1$, at the end of which it is extinguished by opening of contact 52. During this time interval fish in the vicinity are attracted into the electro-attraction region, having passed the region of first reaction. At the end of time interval $t_1$, which is the commencement of time interval $t_2$, the contacts 53 and 54 are closed and the switch 15 is also closed, if this had not been done previously. The main and auxiliary impulses are generated in the manner described. At the end of time interval $t_2$ the contact 53 is opened; this is arranged to take place before the onset of electro-narcosis effects. Time interval $t_3$ commences, during which the capacitor 3 continues to recharge capacitor 8 as the latter discharges through ignitron pairs and anode 10. Now however, the charge of capacitor 3 is not replenished, so that the main current impulses gradually decrease in amplitude exponentially as indicated in FIG. 2. The auxiliary impulses continue at full amplitude. During the time interval $t_3$ substantially all of the fish not previously caught are pumped in. The loss effects due to electro-narcosis are avoided. Gathering in of the catch is completed at the end of $t_3$, whence contact 54 may be reopened, the auxiliary impulses also discontinued, and contact 52 reclosed to repeat the cycle.

Exemplary values for components in the circuitry of FIG. 1 are: capacitor 8: 3200 microfarads, corresponding to inductance of main impulse circuit of 0.3 millihenry and resistance of 0.25 ohm; voltage ratio of capacitors 3 and 13: approximately 3:1; capacitor 3: several times 10,000 microfarads. Designating the values of the capacitances 3 and 8 as $C_1$ and $C_2$ respectively, the expression for the amplitude of the main impulse during $t_3$ after the $n$th discharge is given by $$E_n = E\left(\frac{1}{1+\frac{C_2}{C_1}}\right)^n$$

where E is the initial amplitude, and $E_n$ the instant amplitude. For $$\frac{C_2}{C_1} = \frac{1}{150}$$

the amplitude is halved after 100 discharges.

The cycling of lamp on for $t_1$ only; main and auxiliary impulses on full amplitude for $t_2$; and main impulses decaying and auxiliary impulses full amplitude for $t_3$ need not always be followed exactly; as previously pointed out, in some applications the lighting effects may be dispensed with. In other applications it may be desirable to continue lighting also during $t_2$ and possibly also during $t_3$. Alternatively, instead of permitting the main impulses to decay gradually during $t_3$, it may be desirable to discontinue them instantly; this requires insertion of the contact 53 intermediate of capacitor 3 and junction 8a. The particular modification chosen will depend upon the species of fish.

The cycle of switching operations may be mechanized by utilizing the remaining circuitry illustrated in FIG. 1, which includes relays 49, 50 and 51 which are associated with contacts 54, 53 and 52 respectively. The representation of relays employs a "repulsion" convention, that is the relay armatures are closer to the relay coils in the deenergized state than in the energized state.

The relay coils are connected at their upper ends to the direct voltage supply source 56, and at their lower ends to the moveable contacts of respective selector switches 46, 47 and 48. These selector switches are arranged, as is indicated with reference to switch 48, to engage stationary contacts, which are designated in descending order: "off"; $t_1$; $t_2$; $t_3$; $t_1+t_2$; $t_1+t_2$; $t_1+t_3$; and $t_2+t_3$. Selector switch 48 is provided with an additional contact designated $t_1+t_2+t_3$. Engagement of a movable contact with a given one of the stationary contacts is indicative of the time interval of energization of the associated relay. Thus relay 49 is connected for energization for the time intervals $t_2+t_3$, relay 50 for energization for time interval $t_2$, and relay 51 for energization for the time interval $t_1$, in accord with the previous description.

The return path to the source 56 is complete through a contact 36 of a relay 32 for $t_1$; through a contact 39 of a relay 33 for $t_2$; through a contact 42 of a relay 34 for $t_3$; through contacts 40 or 37 of relays 33 and 32 respectively for $t_1+t_2$; through contacts 44 or 38 of relays 34 and 32 respectively for $t_1+t_3$; and through contacts 43 or 41 of relays 34 and 33 respectively. Connection to the source 56 is direct for $t_1+t_2+t_3$. In each of these instances it is presupposed that a path through a given contact is complete with the associated relay energized.

Energization of the relays 32, 33 and 34 is accomplished by means of respective clock mechanisms 29, 30 and 31, which are supplied by alternating source 45 through switch 35 upon closure of the latter. The clocks are set for the time intervals $t_1$, $t_2$ and $t_3$ respectively. Thereupon switch 35 is closed concurrently with switch 15. This actuates clock 29 and energizes relay 32, and for the example chosen also relay 51 and therefore lights lamp 16. At the expiration of $t_1$, clock 29 shuts itself off and deenergizes relay 32, and at the same time through electro-mechanical interconnections 29a turns on clock 30 and energizes relay 33, and in the present example relays 49 and 50 are also energized. This gives rise to the events occurring during $t_2$ at the end of which clock 30 shuts itself off and deenergized relay 33 and also relay 50, and through electro-mechanical interconnections 30a turns on clock 31 and energizes relay 34, and in the present example maintains relay 49 energized. This gives rise to the events occurring during $t_3$ at the end of which clock 31 turns itself off and deenergizes relay 34, and through electro-mechanical interconnections 31a turns on clock 29 once more and reenergizes relay 32 once more to initiate a second cycle. The clock interconnections may be by way of well known clock driven cam switches and suitable hold circuits for the relays.

The excitation circuitry for the ignitrons 4, 5, 6 and 7 and 14 is illustrated in FIG. 6, to which reference is now made. Alternating voltage $E_{ac}$ is applied to the primary winding of a transformer 62 the lower end of whose secondary winding is connected to the common line 100. The upper end of the secondary is connected to the anode of a rectifier diode 63 whose cathode is connected to one plate of a condenser 64, the other plate thereof being tied to line 100. The diode further connects through the primary windings of transformers 69 and 70 to the anode of a thyratron 35 whose cathode connects through a capacitor 84 to line 100 and also through the primary windings of transformers 72 and 71 to the anode of a further thyratron 36 whose cathode is tied to line 100.

The thyratrons operate in a relaxation circuit in that thyratron 35 conducts to transfer the rectified potential of capacitor 64 to capacitor 84 while thyratron 36 is non conducting, and then capacitor 84 discharges through conducting thyratron 36 while thyratron 35 is extinguished. This is accomplished by means of cross coupled timing circuits from the anode circuit of one thyratron to the grid circuit of the other. Assuming that thyratron 35 has just begun to conduct, the leading edge of the current pulse is coupled via transformer 70 and the thereto coupled transformer 78 to a bridge rectifier network 88, across the output of which there are connected in shunt charging condenser 89 and timing resistor 90, the left ends of which are connected to the grid of thyratron 36 and the right ends of which are connected through the secondary winding of a transformer 92 to the cathode of thyratron 36. The primary winding of transformer 92 may be assumed to be deenergized for the time being.

Because of their differentiating properties the transformers 70 and 78 transmit merely the leading and trailing edges of the current pulses in the anode circuits of thyratron 35. The impulse due to the leading edge is sufficient to charge the grid side of capacitor 89 negatively with respect to the cathode side to insure non-conduction of thyratron 36. After lapse of some time determined by the time constant of members 89 and 90, the capacitor 89 discharges sufficiently to permit conduction of the thyratron. The leading edge of the resultant current pulse is coupled to the grid of thyratron 35 as an extinction pulse via a symmetrical cross coupling circuit including transformers 71, 77, bridge rectifier 85, time constant capacitor 86 and resistor 87 and secondary winding of transformer 91 which may also be assumed to be deenergized for the time being. Here too the negative cut off potential discharges after a like time interval whereafter thyratron 35 once more conducts and thyratron 36 is extinguished. The operation is oscillatory in nature. The trailing edges of the cross coupled pulses are of no moment owing to the blocking action of the rectifiers 85 and 88.

The resistors 87 and 90 are ganged together for unitary adjustment through connections 101 to control the period of oscillation such that initiation of current flow through thyratron 35 may fire ignitrons 4 and 7, while initiation of the current flow through thyratron 36 may fire ignitrons 5 and 6 at the desired proper time. If desired the synchronization of firing can be controlled by application of a synchronizing potential $E_{syn}$ to the primary windings of transformers 91 and 92.

The leading edges of the current pulses in the anode circuits of the thyratrons 35 and 36 are utilized to fire the ignitrons 4, 5, 6 and 7 in the cyclical order previously named. The secondary windings of the transformers 69—72 are connected to the ignitrons 4, 7, 6 and 5 respectively for this purpose; in each instance the right end of the transformer secondary is connected to the control electrode, and its left end to the cathode of the associated thyratron.

The ignitron 14 may be fired in predetermined time relation with the firing of the other ignitrons by means of a delay circuit 102 for example. This may include one or more stages of monostable multivibrators, the first of which is triggered by the pulses applied thereto from transformer 69, and whose trailing edge in turn triggers the second such multivibrator or is applied directly to the primary winding of a transformer 104 whose secondary is connected to the control electrode and cathode of ignitron. Alternatively the trailing edge of the second multivibrator may be applied to transformer 104 for the same purpose. The delay is made to be adjustable to meet requirements.

It will be recalled that with the firing of the ignitron pairs the capacitor 8 is discharged and immediately recharged to opposite polarity. In some applications the voltage stresses attendant to such capacitor charging may be objectionable; it may be sufficient to apply an initial voltage to the electrodes that is merely equal approximately to the voltage of capacitor 3, rather than twice such voltage. To this end a relay 106 may be connected to the delay means 102, to be energized during the time intervals spanning successive main impulses 18. Energization of the relay closes a shunt discharge circuit for capacitor 8, including relay contact 108 and resistor 110. The time constant of capacitor 8 and resistor 110 is selected for complete discharge prior to reopening of contact 108, which in turn is prior to the next firing of an ignitron pair. In this manner the capacitor 8 is always uncharged at the commencement of conduction of an ignitron pair.

It should be understood that the exciting circuit for the ignitrons is only exemplary, as other well-known circuits may be substituted therefor. Further, the invention is not limited to pump fishing but can be applied to net fishing as well, as will be presently explained with reference to FIGS. 3–5.

FIG. 3 illustrated a side view and end view of a fishing vessel 21, that is provided with a lengthwise extending toothed roller 22 on board, from which a vertically extending fishing net 20 is lowered into the water. FIG. 5 illustrates an enlarged front and side view of roller 22. The roller permits ready heaving of the netting aboard the vessel. The net 20 is provided with interwoven electrode plates 23. An advantage of this arrangement is due to the fact, that after cut of the main impulses the fish drawn to the net 23 by electro-attraction adhere to the netting 20 without narcosis effect and therefore without loss due to sinking.

For a further improvement a hoisting rope 25 is secured to the lower end of the netting 20 at attachments 24. Rope 25 runs along a laterally extending boom 26 and over a roller 27 located towards the end thereof and may be drawn in or lowered by means of a wench 28. At the termination of the auxiliary impulses subsequent to $t_3$, the lower ends 24 of the netting are drawn in by means of the hoisting rope 25 while the upper end of the netting is maintained in place. In this manner the fish adhering to the anode are suspended in a net pouch as illustrated in FIG. 4. Thereafter the net may be heaved aboard, emptied, and released once more vertically dependent for hauling in of the net, a motor-driven net roll is employed which is provided with knubs that project from the roll surface and engage the meshes of the netting for drawing aboard of the netting. Several nets may be employed for heaving in different directions. In this procedure the light source is withdrawn from the water during the time interval $t_2$.

The light source need not be fixed in one location. As an alternative, it is lowered deep into the water by means of the electric connecting cable, and then drawn upward during the time interval $t_1$. Accordingly, fish are attracted to the anode from greater depth.

A further aspect of the invention is in the use of a stroboscope tube as light source which is enclosed within a glass container filled with a coolant, for example, oil. This affords excellent cooling of the tube and permits operation at multiples of normal rating. This arrangement takes advantage of a further physiological effect, namely greater photo attraction by means of low frequency, light impulses, of the order of visible flicker or slightly higher than is available from continuous light. Such flashing effect permits lighting at greater intensity and thus beneficially utilizes the photo attraction effect for larger ranges and at the same time reduces electrical power requirements.

Thus it will be seen that in accordance with the invention there have been provided practical and efficient electrical fishing method and apparatus. Several embodiments of the basic inventive concept have been described. Further modifications will occur to those skilled in the art and it is intended that all such modifications be embraced within the scope of the invention as defined by the following claims.

What is claimed is:

1. An electrical fishing method comprising the steps of immersing into the fishing water a pair of electrodes, and fish capturing means adjacent one of said electrodes; sending spaced current impulses through said fishing water via said electrodes, thereby to electro-attract the fish toward said one electrode, said impulses intended to be of one polarity but apt to experience undesired overshoots of opposite polarity effective to repel the fish from said one electrode; sending auxiliary current impulses through said fishing water via said electrodes during the incidences of said overshoots thereby to neutralize the same; discontinuing sending said main impulses while continuing sending said auxiliary impulses; and gathering in the fish attracted to said one electrode with said fish capturing means during the course of the preceding steps.

2. An electrical fishing method comprising the steps of immersing into the fishing water a pair of electrodes and fish capturing means adjacent one of said electrodes; sending spaced current impulses through said fishing water via said electrodes, thereby to electro-attract the fish toward said one electrode, said impulses intended to be of one polarity but apt to experience undesired overshoots of opposite polarity effective to repel the fish from said one electrode; sending auxiliary current impulses through said fishing water via said electrodes during the incidences of said overshoots thereby to neutralize the same; discontinuing sending said main impulses while continuing sending said auxiliary impulses; cyclically repeating those aforegoing steps following the immersing step; and gathering in the fish attracted to said one electrode with said fish capturing means during the course of the preceding steps.

3. An electrical fishing method comprising the steps of immersing into the fishing water an anode and a cathode electrode, a light source and fish capturing means adjacent said anode; energizing for a first time interval said light source to photo-attract fish towards said anode; deenergizing said light source and for a second time interval sending spaced positive current impulses through said fishing water from said anode to said cathode, thereby to electro-attract the fish toward said anode, said impulses being apt to experience undesired negative overshoots effective to repel the fish from said anode; and sending for said second time interval auxiliary positive current impulses through said fishing water from said anode to said cathode during the incidences of said overshoots thereby to neutralize the same; discontinuing said auxiliary impulses and cyclically repeating those aforegoing steps following the immersing step; and gathering in the fish attracted to said anode with said fish capturing means during the course of the preceding steps.

4. An electrical fishing method comprising the steps of immersing into the fishing water a pair of electrodes, and a light source fish capturing means adjacent one of said electrodes; energizing for a first time interval said light source to photo-attract fish towards said one electrode; deenergizing said light source and for a second time interval sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending auxiliary current impulses through said fishing water via said electrodes during the incidences of said overshoots thereby to neutralize the same; gradually diminishing the amplitude of said main impulses ultimately to zero while continuing sending said auxiliary impulses; and gathering in the fish attracted to said one electrode with said fish capturing means during the course of the preceding steps.

5. An electrical fishing method comprising the steps of immersing into the fishing water an anode and a cathode electrode, a light source and fish capturing means adjacent said anode; energizing for a first time interval said light source to photo-attract fish towards said anode; deenergizing said light source and for a second time interval sending spaced positive current impulses through said fishing water from said anode to said cathode, thereby to electro-attract the fish toward said anode, said impulses being apt to experience undesired negative overshoots effective to repel the fish from said anode; sending for said second time interval auxiliary positive current impulses through said fishing water from said anode to said cathode during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps in the same sequence following the immersing step; and gathering in the fish attracted to said anode with said fish capturing means during the course of the preceding steps.

6. An electrical fishing method comprising the steps of immersing into the fishing water a pair of electrodes, and fish capturing means adjacent one of said electrodes; sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending auxiliary current impulses through said fishing water via said electrodes during the incidences of said overshoots thereby to neutralize the same; gradually diminishing the amplitude of said main impulses ultimately to zero while continuing sending said auxiliary impulses; cyclically repeating those aforegoing steps following the immersing step; and gathering in the fish attracted to said one electrode with said fish capturing means during the course of the preceding steps.

7. An electrical fishing method comprising the steps of immersing into the fishing water an anode and a cathode electrode, a light source and fish capturing means adjacent said anode; energizing for a first time interval said light source to photo-attract fish towards said anode; deenergizing said light source and for a second time interval sending spaced positive current impulses through said fishing water from said anode to cathode producing pulses at low repetition rate, thereby to electro-attract the fish toward said anode, said impulses being apt to experience undesired negative overshoots effective to repel the fish from said anode; sending for said second time interval auxiliary positive current impulses through said fishing water from said anode to cathode during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said anode with said fish capturing means during the course of the preceding steps.

8. An electrical fishing method comprising the steps of immersing into the fishing water a pair of electrodes, a light source and fish capturing means adjacent one of said electrodes; energizing for a first time interval said light source to photo-attract fish towards said one electrode; deenergizing said light source and for a second time interval sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending for said second time interval auxiliary current impulses through said fishing water via said electrodes during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said one electrode with said fish capturing means during the course of the preceding steps.

9. An electrical fishing method comprising the steps of immersing into the fishing water an anode and a cathode electrode, a light source and fish capturing means adjacent said anode; energizing for a first time interval said light source to photo-attract fish towards said anode; deenergizing said light source and for a second time interval sending spaced positive current impulses through said fishing water from said anode to cathode, thereby to electro-attract the fish toward said anode, said impulses being apt to experience undesired negative overshoots effective to repel the fish from said anode; sending for said second time interval auxiliary positive current impulses through said fishing water from said anode to cathode during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said anode with said fish capturing means during the course of the preceding steps.

10. An electrical fishing method comprising the steps of immersing into the fishing water a pair of electrodes, a light source and fish capturing means adjacent one of said electrodes; energizing for a first time interval said light source to photo-attract fish towards said one electrode; deenergizing said light source and for a second time interval sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending for said second time interval auxiliary current impulses through said fishing water via said electrodes during the incidences of said overshoots thereby to neutralize the same; discontinuing said main impulses and during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said one electrode with said fish capturing means during the course of the preceding steps.

11. An electrical fishing method comprising the steps of immersing into the fishing water an anode and a cathode electrode, a light source and fish capturing means adjacent said anode; energizing for a first time interval said light source to photo-attract fish towards said anode; deenergizing said light source and for a second time interval sending spaced positive current impulses through said fishing water from said anode to cathode, thereby to electro-attract the fish toward said anode, said impulses being apt to experience undesired negative overshoots effective to repel the fish from said anode; sending for said second time interval auxiliary positive current impulses through said fishing water from said anode to cathode during the incidences of said overshoots thereby to neutralize the same; discontinuing said main impulses and during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said anode with said fish capturing means during the course of the preceding steps.

12. An electrical fishing method comprising the steps of immersing into the fishing water a pair of electrodes, a light source and fish capturing means adjacent one of said electrodes; energizing for a first time interval said light source to flash at a low frequency thereby to photo-attract fish towards said one electrode; deenergizing said light source and for a second time interval sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending for said second time interval auxiliary current impulses through said fishing water via said electrodes during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said one electrode with said fish capturing means during the course of the preceding steps.

13. An electrical fishing method comprising the steps of immersing into the fishing water an anode and a cathode electrode, a light source and fish capturing means adjacent said anode; energizing for a first time interval said light source to flash at a low frequency thereby to photo-attract fish towards said anode; deenergizing said light source and for a second time interval sending spaced positive current impulses through said fishing water from anode to cathode, thereby to electro-attract the fish toward said anode, said impulses being apt to experience undesired negative overshoots effective to repel the fish from said anode; sending for said second time interval auxiliary positive current impulses through said fishing water from said anode to cathode during the incidences of said overshoots thereby to neutralize the same; during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said anode with said fish capturing means during the course of the preceding steps.

14. An electrical fishing method comprising the steps of immersing into the fishing water a pair of electrodes, a light source and fish capturing means adjacent one of said electrodes; energizing for a first time interval said light source to flash at a low frequency thereby to photo-attract fish towards said one electrode; deenergizing said light source and for a second time interval sending spaced current impulses through said fishing water via said electrodes, thereby to electro-attract the fish toward said one electrode, said impulses intended to be of one polarity but being apt to experience undesired overshoots of opposite polarity effective to repel the fish from said one electrode; sending for said second time interval auxiliary current impulses through said fishing water via said electrodes during the incidences of said overshoots thereby to neutralize the same; discontinuing said main impulses and during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said one electrode with said fish capturing means during the course of the preceding steps.

15. An electrical fishing method comprising the steps of immersing into the fishing water an anode and a cathode electrode, a light source and fish capturing means adjacent said anode; energizing for a first time interval said light source to flash at a low frequency thereby to photo-attract fish towards said anode; deenergizing said light source and for a second time interval sending spaced positive current impulses through said fishing water from said anode to cathode, thereby to electro-attract the fish toward said anode, said impulses being apt to experience undesired negative overshoots effective to repel the fish from said anode; sending for said second time interval auxiliary positive current impulses through said fishing water from said anode to cathode during the incidences of said overshoots thereby to neutralize the same; discontinuing said main impulses and during a third time interval gradually diminishing the amplitude of said main impulses ultimately to zero while continuing sending said auxiliary impulses; discontinuing said auxiliary impulses and cyclically repeating those aforegoing steps following the immersing step; and gathering in the fish attracted to said anode with said fish capturing means during the course of the preceding steps.

16. Electrical fishing apparatus comprising a pair of electrodes adapted to be immersed in the fishing water; a light source and fish capturing means also adapted to be immersed in the fishing water adjacent one of said electrodes; means for energizing for a first time interval said light source to photo-attract fish towards said one electrode; means for sending for a second time interval spaced main current impulses through said fishing water via said electrodes, thereby to electro-attract the fish toward said one electrode, said impulses intended to be of one polarity but being apt to experience undesired overshoots of opposite polarity effective to repel the fish from said one electrode; means for sending for said second and also a third time interval auxiliary current impulses through said fishing water via said electrodes during the incidences of said overshoots thereby to neutralize the same; and means for modifying, during said third time interval, the operation of said main impulse sending means to cause gradual diminution of the amplitude of said main impulses ultimately to zero.

17. Electrical fishing apparatus comprising an anode and a cathode electrode adapted to be immersed in the fishing water; a light source and fish capturing means also adapted to be immersed in the fishing water adjacent said anode; means for energizing for a first time interval said light source to photo-attract fish towards said anode; means for sending for a second time interval spaced main positive current impulses through said fishing water from said anode to said cathode, thereby to electro-attract the fish toward said anode, said impulses being apt to experience undesired negative overshoots effective to repel the fish from said anode; means for sending for said second and also a third time interval auxiliary current impulses through said fishing water from said anode to said cathode during the incidences of said overshoots thereby to neutarilze the same; and means for modifying, during said third time interval, the operation of said main impulse sending means to cause gradual diminution of the amplitude of said main impulses ultimately to zero.

18. Electrical fishing apparatus comprising a pair of electrodes adapted to be immersed in the fishing water; a light source and fish capturing means also adapted to be immersed in the fishing water adjacent one of said electrodes; means for energizing for a first time interval said light source to photo-attract fish towards said one electrode; means for sending for a second time interval spaced main current impulses through said fishing water via said electrodes, thereby to electro-attract the fish toward said one electrode, said impulses intended to be of one polarity but being apt to experience undesired overshoots of opposite polarity effective to repel the fish from said one electrode; and means for sending for said second and also a third time interval auxiliary current impulses through said fishing water via said electrodes during the incidences of said overshoots thereby to neutralize the same.

19. Electrical fishing apparatus comprising an anode and a cathode electrode adapted to be immersed in the fishing water; a light source and fish capturing means also adapted to be immersed in the fishing water adjacent said anode; means for energizing for a first time interval said light source to photo-attract fish towards said anode; means for sending for a second time interval spaced main positive current impulses through said fishing water from said anode to said cathode, thereby to electro-attract the fish toward said anode, said impulses being apt to experience undesired negative overshoots effective to repel the fish from said anode; and means for sending for said second and also a third time interval auxiliary current impulses through said fishing water from said anode to said cathode during the incidences of said overshoots thereby to neutralize the same.

20. Electrical fishing apparatus comprising a pair of electrodes adapted to be immersed in the fishing water; a light source and fish capturing means also adapted to be immersed in the fishing water adjacent one of said electrodes; means for energizing for a first time interval said light source to photo-attract fish towards said one electrode; means for sending for a second time interval spaced main current impulses through said fishing water via said electrodes, thereby to electro-attract the fish toward said one electrode, said impulses intended to be of one polarity but being apt to experience undesired overshoots of opposite polarity effective to repel the fish from said one electrode; means for sending for said second and also a third time interval auxiliary current impulses through said fishing water via said electrodes during the incidences of said overshoots thereby to neutralize the same; means for modifying, during said third time interval, the operation of said main impulse sending means to cause gradual diminution of the amplitude of said main impulses ultimately to zero; and means for automatically recycling in sequence the operation of said light energizing, main impulse sending, auxiliary impulse sending and modifying means, thereby to enable gathering in by said fish capturing means substantial numbers of fish present in and in the vicinity of said fishing water.

21. Electrical fishing apparatus comprising an anode and a cathode electrode adapted to be immersed in the fishing water; a light source and fish capturing means also adapted to be immersed in the fishing water adjacent said anode; means for energizing for a first time interval said light source to photo-attract fish towards said anode; means for sending for a second time interval spaced main positive current impulses through said fishing water from said anode to said cathode, thereby to electro-attract the fish toward said anode, said impulses being apt to experience undesired negative overshoots effective to repel the fish from said anode; means for sending for said second and also a third time interval auxiliary current impulses through said fishing water from said anode to said cathode during the incidences of said overshoots thereby to neutralize the same; means for modifying, during said third time interval, the operation of said main impulse sending means to cause gradual diminution of the amplitude of said main impulses ultimately to zero; and means for automatically recycling in sequence the operation of said light energizing, main impulse sending, auxiliary impulse sending and modifying means, thereby to enable gathering in by said fish capturing means substantial numbers of the fish present in and in the vicinity of said fishing water.

22. Electrical fishing apparatus comprising a pair of electrodes adapted to be immersed in the fishing water; a light source and fish capturing means also adapted to be immersed in the fishing water adjacent one of said electrodes; means for energizing for a first time interval said light source to flash at a low frequency thereby to photo-attract fish towards said one electrode; means for sending for a second time interval spaced main current impulses through said fishing water via said electrodes, thereby to electro-attract the fish toward said one electrode, said impulses intended to be of one polarity but being apt to experience overshoots of opposite polarity effective to repel the fish from said one electrode; means for sending for said second and also a third time interval auxiliary current impulses through said fishing water via said electrodes during the incidences of said overshoots thereby to neutralize the same; and means for modifying, during said third time interval, the operation of said main impulse sending means to cause gradual diminution of the amplitude of said main impulses ultimately to zero.

23. Electrical fishing apparatus comprising an anode and a cathode electrode adapted to be immersed in the fishing water; a light source and fish capturing means also adapted to be immersed in the fishing water adjacent said anode; means for energizing for a first time interval said light source to flash at a low frequency thereby to photo-attract fish towards said anode; means for sending for a second time interval spaced main positive current impulses through said fishing water from said anode to said cathode, thereby to electro-attract the fish toward said anode, said impulses being apt to experience undesired negative overshoots effective to repel the fish from said anode; means for sending for said second and also a third time interval auxiliary current impulses through said fishing water from said anode to said cathode during the incidences of said overshoots thereby to neutralize the same; and means for modifying, during said third time interval, the operation of said main impulse sending means to cause gradual diminution of the amplitude of said main impulses ultimately to zero.

24. Electrical fishing apparatus comprising a pair of electrodes adapted to be immersed in the fishing water; a light source and fish capturing means also adapted to be immersed in the fishing water adjacent one of said electrodes; means for energizing for a first time interval said light source to photo-attract fish towards said one electrode; means for sending for a second time interval spaced main current impulses through said fishing water via said electrodes, thereby to electro-attract the fish toward said one electrode, said impulses intended to be one of polarity but being apt to experience undesired overshoots of opposite polarity effective to repel the fish from said one electrode; means for sending for said second and also a third time interval auxiliary current impulses through said fishing water via said electrodes during the incidences of said overshoots thereby to neutralize the same; means for modifying, during said third time interval, the operation of said main impulse sending means to cause gradual diminution of the amplitude of said main impulses ultimately to zero; and means for automatically recycling in sequence the operation of said light energizing, main impulse sending, auxiliary impulse sending and modifying means, thereby to enable gathering in by said fish capturing means substantial numbers of fish present in and in the vicinity of said fishing water, said automatic recycling means comprising a plurality of clock means operable for predetermined periods in accordance with said 3 time intervals, and a plurality of switching means responsive to said clock means enabling and disabling the operations of said light energizing, main impulse sending and auxiliary impulse sending means and effecting the modification of the main impulse sending means.

25. Electrical fishing apparatus comprising an anode and a cathode electrode adapted to be immersed in the fishing water; a light source and fish capturing means also adapted to be immersed in the fishing water adjacent said anode; means for energizing for a first time interval said light source to photo-attract fish towards said anode; means for sending for a second time interval spaced main positive current impulses through said fishing water from said anode to said cathode, thereby to electro-attract the fish toward said anode, said impulses being apt to experience undesired negative overshoots effective to repel the fish from said anode; means for sending for said second and also a third time interval auxiliary current impulses through said fishing water from said anode to said cathode during the incidences of said overshoots thereby to neutralize the same; means for modifying, during said third time interval, the operation of said main impulse sending means to cause gradual diminution of the amplitude of said main impulses ultimately to zero; and means for automatically recycling in sequence the operation of said light energizing, main impulse sending, auxiliary impulse sending and modifying means, thereby to enable gathering in by said fish capturing means substantial numbers of fish present in and in the vicinity of said fishing water, said automatic recycling means comprising a plurality of clock means operable for predetermined periods in accordance with said 3 time intervals, and a plurality of switching means responsive to said clock means enabling and disabling the operations of said light energizing, main impulse sending and auxiliary impulse sending means and effecting the modification of the main impulse sending means.

26. For use in combination with fish capturing means: electrical fishing apparatus comprising a source of light, a cathode and an anode electrode, all adapted to be immersed into fishing water, said anode and light source being disposed adjacent said fish capturing means; a first storage capacitor connected to said cathode; means adapted continuously to apply charging potential to said capacitor; means including a second storage capacitor interconnecting said anode and first capacitor adapted to transfer energy from said first to said second capacitor and from the latter to said fishing water via said anode in the form of spaced positive main current impulses being apt to experience undesired negative overshoots; means adapted to pass positive auxiliary current impulses from said anode via said fishing water to said cathode during the incidences of said overshoots thereby to neutralize the same; and means for automatically cyclically first energizing said light source to photo-attract fish to said fish capturing means, next deenergizing said light source and actuating said energy transfer and auxiliary impulse passing means for producing said main and auxiliary impulses at full amplitude, thereby to electro-attract fish to said fish capturing means, next inhibiting charging of said first capacitor thereby to reduce the amplitude of said main impulses gradually to zero, and finally inhibiting passing said auxiliary impulses, whereby substantial numbers of fish present in and in the vicinity of said fishing water may be gathered in by said fish capturing means.

27. For use in combination with fish capturing means: electrical fishing apparatus comprising, a cathode and an anode electrode, adapted to be immersed into fishing water, said anode being disposed adjacent said fish capturing means; a first storage capacitor connected to said cathode; means adapted continuously to apply charging potential to said capacitor; means including a second storage capacitor interconnecting said anode and first capacitor adapted to transfer energy from said first to said second capacitor and from the latter to said fishing water via said anode in the form of spaced positive main current impulses being apt to experience undesired negative overshoots; means adapted to pass positive auxiliary current impulses from said anode via said fishing water to said cathode during the incidences of said overshoots thereby to neutralize the same; and means effective to interrupt charging of said first capacitor thereby to cause said main impulses to reduce in amplitude ultimately to zero, said light source and main impulses serving to attract fish towards said fish capturing means and said auxiliary impulses serving to prevent repellent effect of said overshoots.

28. For use in combination with fish capturing means: electrical fishing apparatus comprising a source of light, a cathode and an anode electrode, all adapted to be immersed into fishing water, said anode and light source being disposed adjacent said fish capturing means; a first storage capacitor connected to said cathode; means adapted continuously to apply charging potential to said capacitor; means including a second storage capacitor interconnecting said anode and first capacitor adapted to transfer energy from said first to said second capacitor and from the latter to said fishing water via said anode in the form of spaced positive main current impulses being apt to experience undesired negative overshoots; means adapted to pass positive auxiliary current impulses from said anode via said fishing water to said cathode during the incidences of said overshoots thereby to neutralize the same; and means effective to interrupt charging of said first capacitor thereby to cause said main impulses to reduce in amplitude ultimately to zero, said light source and main impulses serving to attract fish towards said fish capturing means and said auxiliary impulses serving to prevent repellent effect of said overshoots.

29. For use in combination with fish capturing means: electrical fishing apparatus comprising a source of light, a cathode and an anode electrode, all adapted to be immersed into fishing water, said anode and light source being disposed adjacent said fish capturing means; a first storage capacitor connected to said cathode; means adapted continuously to apply charging potential to said capacitor; means including a second storage capacitor interconnecting said anode and first capacitor adapted to transfer energy from said first to said second capacitor and from the latter to said fishing water via said anode in the form of spaced positive main current impulses being apt to experience undesired negative overshoots; means adapted to pass positive auxiliary current impulses from said anode via said fishing water to said cathode during the incidences of said overshoots thereby to neutralize the same; and means for automatically cyclically first energizing said light source to photo-attract fish to said fish capturing means, next deenergizing said light source and actuating said energy transfer and auxiliary impulse passing means for producing said main and auxiliary impulses at full amplitude, thereby to electro-attract fish to said fish capturing means, next inhibiting charging of said first capacitor thereby to reduce the amplitude of said main impulses gradually to zero, and finally inhibiting passing said auxiliary impulses, whereby substantial numbers of fish present in and in the vicinity of said fishing water may be gathered in by said fish capturing means.

30. For use in combination with fish capturing means: electrical fishing apparatus comprising a source of light, a cathode and an anode electrode, all adapted to be immersed into fishing water, said anode and light source being disposed adjacent said fish capturing means; a first storage capacitor connected to said cathode; means adapted continuously to apply charging potential to said capacitor; means including a second storage capacitor interconnecting said anode and first capacitor adapted to transfer energy from said first to said second capacitor and from the later to said fishing water via said anode in the form of spaced positive main current impulses being apt to experience undesired negative overshoots; means adapted to pass positive auxiliary current impulses from said anode via said fishing water to said cathode during the incidences of said overshoots thereby to neutralize the same; and means effective to interrupt charging of said first capacitor thereby to cause said main impulses to reduce in amplitude ultimately to zero, said light source and main impulses serving to attract fish towards said fish capturing means and said auxiliary impulses serving to prevent repellent effect of said overshoots.

References Cited in the file of this patent

UNITED STATES PATENTS

| 2,233,045 | Bonner et al. | Feb. 25, 1941 |
| 2,745,205 | Kafka | May 15, 1956 |